(12) United States Patent
Hama et al.

(10) Patent No.: US 9,893,386 B2
(45) Date of Patent: Feb. 13, 2018

(54) SOLID SECONDARY BATTERY SYSTEM AND MANUFACTURING METHOD OF RECOVERABLE SOLID SECONDARY BATTERY

(75) Inventors: Shigenori Hama, Sunto-gun (JP); Koji Kawamoto, Miyoshi (JP); Masashi Kodama, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 435 days.

(21) Appl. No.: 14/122,411

(22) PCT Filed: May 24, 2012

(86) PCT No.: PCT/IB2012/001006
§ 371 (c)(1),
(2), (4) Date: Nov. 26, 2013

(87) PCT Pub. No.: WO2012/164366
PCT Pub. Date: Dec. 6, 2012

(65) Prior Publication Data
US 2014/0125291 A1    May 8, 2014

(30) Foreign Application Priority Data
May 27, 2011    (JP) .................................. 2011-119381

(51) Int. Cl.
*H02J 7/00*    (2006.01)
*H01M 10/44*    (2006.01)
(Continued)

(52) U.S. Cl.
CPC ....... *H01M 10/44* (2013.01); *H01M 10/0525* (2013.01); *H01M 10/0562* (2013.01); *H01M 10/42* (2013.01); *H01M 10/446* (2013.01); *H01M 10/448* (2013.01); *H02J 7/0063* (2013.01); *H01M 2300/0068* (2013.01); *Y02W 30/84* (2015.05)

(58) Field of Classification Search
USPC ........................................................ 320/136
See application file for complete search history.

(56) References Cited

U.S. PATENT DOCUMENTS 6,203,947 B1 *    3/2001    Peled .................. H01M 4/0445
                                                           429/221
2003/0025482 A1 *    2/2003    Tsukamoto ............ A61N 1/378
                                                           320/157
(Continued)

FOREIGN PATENT DOCUMENTS

JP    59-073851 A    4/1984
JP    04-022066 A    1/1992
(Continued)

*Primary Examiner* — Eric Lee
(74) *Attorney, Agent, or Firm* — Andrews Kurth Kenyon LLP (57) ABSTRACT

The invention provides a solid secondary battery system including a solid secondary battery having a cathode active material layer, an anode active material layer, and a solid electrolyte layer formed between the cathode active material layer and the anode active material layer, and an overdischarge processing unit for discharging the solid secondary battery until a SOC of the solid secondary battery becomes less than 0%.

7 Claims, 4 Drawing Sheets

(51) Int. Cl.
*H01M 10/0525* (2010.01)
*H01M 10/0562* (2010.01)
*H01M 10/42* (2006.01)

(56) References Cited

U.S. PATENT DOCUMENTS

2005/0156573 A1\* 7/2005 Lin .................. H02J 7/0031
                                                320/134
2008/0067972 A1\* 3/2008 Takami ............... H01M 4/485
                                                320/103

FOREIGN PATENT DOCUMENTS

| JP | 11-204148 A | 7/1999 |
| JP | 2005-327516 A | 11/2005 |
| JP | 2010-225581 A | 10/2010 |
| JP | 2010-225582 A | 10/2010 |
| WO | 2009/101506 A1 | 8/2009 |

\* cited by examiner

SOLID SECONDARY BATTERY SYSTEM AND MANUFACTURING METHOD OF RECOVERABLE SOLID SECONDARY BATTERY

CROSS REFERENCE TO RELATED APPLICATION

This is a national phase application based on the PCT International Patent Application No. PCT/IB2012/001006 filed on May 24, 2012, claiming priority to Japanese application No. 2011-119381 filed May 27, 2011, the entire contents of both of which are incorporated herein by reference.

BACKGROUND OF THE INVENTION

1. Field of the Invention

The invention relates to a solid secondary battery system capable of recovering deterioration in output characteristics.

2. Description of Related Art

With the recent rapid spread of information-related equipment or communication equipment such as personal computers, video cameras and mobile phones, manufacturers and developers are placing more importance than ever on development of batteries used as power sources in such equipment. In automobile industries as well, development of high-output and high-capacity batteries for use in electric or hybrid vehicles has been pursued. Currently, among a variety of batteries, lithium secondary batteries are the ones attracting the most attention for their high energy density.

Lithium secondary batteries currently on market typically have electrolyte containing a combustible organic solvent. Therefore, they require provision of a safety device for suppressing increase in temperature in case of short circuit, or improvement in configuration or materials for preventing occurrence of short circuit. On the other hand, solid lithium secondary batteries are provided with a solid electrolyte layer in place of the liquid electrolyte so that they are made in solid state. Since no combustible organic solvent is used in such solid lithium secondary batteries, the safety devices can be simplified, and hence these solid lithium secondary batteries are considered to be superior in terms of manufacturing cost and productivity.

In addition, secondary batteries, which can be repeatedly charged and discharged, are apt to be deteriorated in battery performance by overdischarge. Therefore, conventional secondary batteries are provided with means for measuring a battery voltage during discharge and terminating discharge when the battery voltage reaches a predetermined value. On the other hand, Japanese Patent Application Publication No. 2010-225581 (JP-2010-225581 A) discloses a battery module which has no overdischarge protection means for preventing overdischarge of a lithium secondary battery. Japanese Patent Application Publication No. 2010-225582 (JP-2010-225582 A) discloses a dynamo-electric device having no overdischarge protection means for preventing overdischarge of a lithium secondary battery.

Solid secondary batteries in general have a problem that repeated charge and discharge cause increase of internal resistance and deterioration of output characteristics. The solid secondary batteries further have a problem that when stored at a high temperature (e.g. about 60° C.), internal resistance is increased and output characteristics is deteriorated. It is usually difficult to recover the output characteristics once deteriorated.

SUMMARY OF THE INVENTION

The invention provides a solid secondary battery system which is able to recover deterioration in output characteristics.

The inventors of this invention have found, as a result of their earnest studies, that, contrary to expectations, it is effective to positively (intentionally) overdischarge a battery in order to recover the degraded output characteristics. The invention has been made based on such finding.

A first aspect of the invention relates to a solid secondary battery system including at least one solid secondary battery that includes a cathode active material layer, an anode active material layer, and a solid electrolyte layer formed between the cathode active material layer and the anode active material layer, and an overdischarge processing unit that discharges the at least one solid secondary battery until a state of charge of the at least one solid secondary battery becomes less than 0%.

According to the invention, the provision of the overdischarge processing unit makes it possible to reduce the internal resistance and to recover the output characteristics. Consequently, the lifetime of the solid secondary battery can be increased.

A second aspect of the invention relates to a solid secondary battery system including: at least one solid secondary battery that includes a cathode active material layer, an anode active material layer, and a solid electrolyte layer formed between the cathode active material layer and the anode active material layer; and an overdischarge processing unit that discharges the at least one solid secondary battery until cathode potential of the at least one solid secondary battery becomes less than Ep V when Ep V denotes a cathode potential before a cathode active material contained in the cathode active material layer emits metal ions.

According to the invention, the provision of the overdischarge processing unit makes it possible to reduce the internal resistance and to recover the output characteristics. Consequently, the lifetime of the solid secondary battery can be increased.

A third aspect of the invention relates to a solid secondary battery system including: at least one solid secondary battery that includes a cathode active material layer containing an active material causing a battery reaction at a potential higher than a Li potential by 3 V or more, an anode active material layer containing a Li-containing metal active material or a carbon active material, and a solid electrolyte layer formed between the cathode active material layer and the anode active material layer; and an overdischarge processing unit that discharges the at least one solid secondary battery until voltage of the at least one solid secondary battery becomes less than 2.5 V.

According to the invention, the provision of the overdischarge processing unit makes it possible to reduce the internal resistance and to recover the output characteristics. Consequently, the lifetime of the solid secondary battery can be increased.

In the first to third aspects of the invention, the overdischarge processing unit may be an external short-circuit unit configured to externally short-circuit the at least one solid secondary battery.

In the first to third aspects of the invention, the at least one solid secondary battery may be a plurality of solid secondary batteries, and the solid secondary battery system may further include a selective control unit that selectively controls so that the overdischarge processing unit functions only to some of the solid secondary batteries. This makes it possible to perform overdischarge processing on some of the solid secondary batteries while supplying power by the other batteries.

In the first to third aspects of the invention, at least one of the cathode active material layer, the anode active material layer and the solid electrolyte layer may contain a sulfide solid electrolyte material. This is because the sulfide solid electrolyte material has a high reactivity and readily produces a highly resistive membrane at an interface with an active material (e.g. an oxide active material), which helps the invention exhibit its advantageous effects.

In the first to third aspects of the invention, the cathode active material layer may contain a cathode active material coated with an ion-conducting oxide. This is because it prevents formation of a highly resistive membrane at an interface between the cathode active material and another material (e.g. solid electrolyte material).

A fourth aspect of the invention relates to a manufacturing method of a recoverable solid secondary battery, including an overdischarge processing step of discharging a degraded solid secondary battery that includes a cathode active material layer, an anode active material layer, and a solid electrolyte layer formed between the cathode active material layer and the anode active material layer, until state of charge of the degraded solid secondary battery becomes less than 0%.

According to the invention, the internal resistance can be reduced and the recoverable solid secondary battery with recovered output characteristics can be obtained by performing the overdischarge processing step.

A fifth aspect of the invention relates to a manufacturing method of a recoverable solid secondary battery, including an overdischarge processing step of discharging a degraded solid secondary battery that includes a cathode active material layer, an anode active material layer, and a solid electrolyte layer formed between the cathode active material layer and the anode active material layer, until cathode potential of the degraded solid secondary battery becomes less than Ep V when Ep V denotes a cathode potential before a cathode active material contained in the cathode active material layer emits metal ions.

According to the invention, the internal resistance can be reduced and the recoverable solid secondary battery with recovered output characteristics can be obtained by performing the overdischarge processing step.

A sixth aspect of the invention relates to a manufacturing method of a recoverable solid secondary battery, including an overdischarge processing step of discharging a degraded solid secondary battery that includes a cathode active material layer containing an active material causing a battery reaction at a potential higher than a Li potential by 3 V or more, an anode active material layer containing a Li-containing metal active material or a carbon active material, and a solid electrolyte layer formed between the cathode active material layer and the anode active material layer, until voltage of the degraded solid secondary battery becomes less than 2.5 V.

According to the invention, the internal resistance can be reduced and the recoverable solid secondary battery with recovered output characteristics can be obtained by performing the overdischarge processing step.

In the fourth to sixth aspects of the invention, in the overdischarge processing step, the degraded solid secondary battery may be discharged by external short-circuit.

In the fourth to sixth aspects of the invention, in the overdischarge processing step, the degraded solid secondary battery may be discharged to 0 V.

In the fourth to sixth aspects of the invention, at least one of a first membrane at a first interface between a cathode active material and a solid electrolyte and a second membrane at a second interface between an anode active material and the solid electrolyte may be removed by discharging the degraded solid secondary battery.

Thus, the solid secondary battery system according to the invention has an advantageous effect of being able to recover deterioration in output characteristic caused by charge and discharge.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A solid secondary battery system and a manufacturing method of a recoverable solid secondary battery according to preferred embodiments of the invention will be described in detail.

A. Solid Secondary Battery System:

In the first place, a solid secondary battery system according to the embodiments will be described. The solid secondary battery system according to the embodiments has an overdischarge processing unit. This overdischarge processing unit is not limited particularly as long as it is designed to overdischarge the solid secondary battery. However, the overdischarge processing unit can be specified more precisely from some perspectives of the overdischarge. The solid secondary battery system according to the embodiments will be described below based on three main embodiments.

1. First Embodiment

A solid secondary battery system according to a first embodiment includes a solid secondary battery having a cathode active material layer, an anode active material layer, and a solid electrolyte layer formed between the cathode active material layer and the anode active material layer, and an overdischarge processing unit which discharges the solid secondary battery until its SOC becomes less than 0%.

Figure 1:
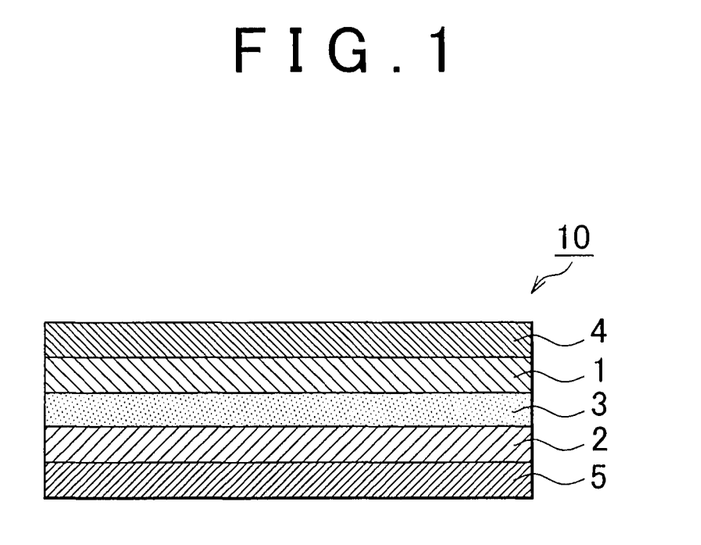
FIG. 1 is a schematic cross-sectional view illustrating an example of a solid secondary battery according to the invention.

FIG. 1 is a schematic cross-sectional view showing an example of the solid secondary battery according to the first embodiment. The solid secondary battery 10 shown in FIG. 1 has a cathode active material layer 1, an anode active material layer 2, a solid electrolyte layer 3 formed between the cathode active material layer 1 and the anode active material layer 2, a cathode collector 4 for collecting power from the cathode active material layer 1, and an anode collector 5 for collecting power from the anode active material layer 2.

Figure 2:
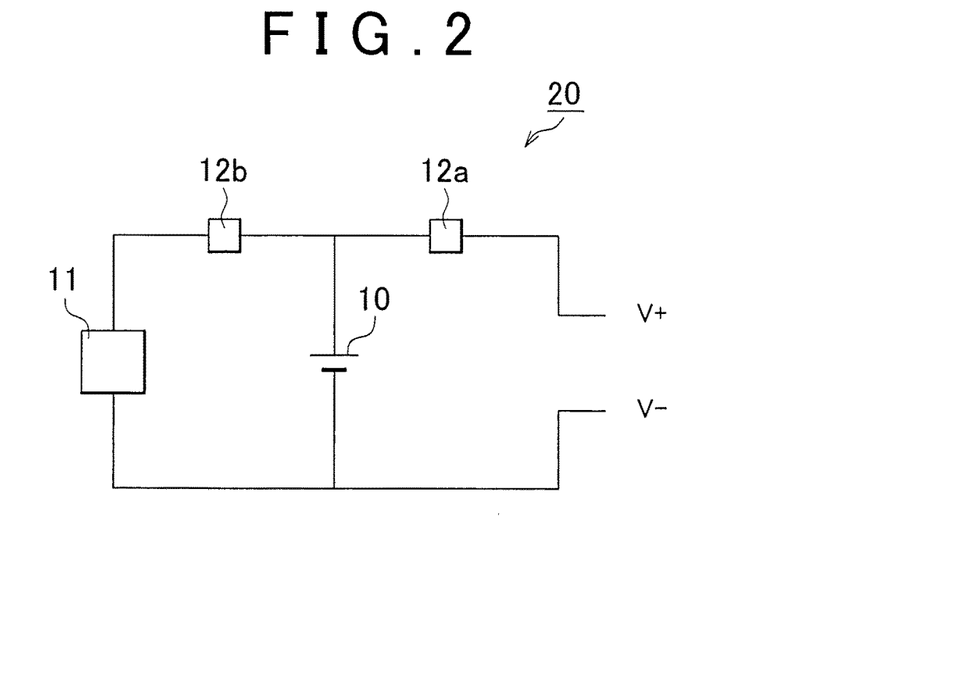
FIG. 2 is a schematic diagram illustrating an example of a solid secondary battery system according to the invention.

FIG. 2 is a schematic diagram showing an example of the solid secondary battery system according to the first embodiment. The solid secondary battery system 20 shown in FIG. 2 has a solid secondary battery 10, and an overdischarge processing unit 11 which discharges the solid secondary battery 10 until its SOC becomes less than 0%. In FIG. 2, the overdischarge processing unit 11 is designed to externally short-circuit the solid secondary battery 10. The term "external short-circuit" as used herein means that the cathode active material layer and the anode active material layer are short-circuited by means of an external circuit. During normal discharge, the solid secondary battery 10 discharges with a switch unit 12a turned ON and a switch unit 12b turned OFF. During overdischarge, in contrast, the solid secondary battery 10 is externally short-circuited with the switch unit 12a turned OFF and the switch unit 12b turned ON. Although not shown in the figure, a control unit is usually provided to control the switch units 12a and 12b according to a voltage.

According to the first embodiment, the provision of the overdischarge processing unit makes it possible to reduce the internal resistance and to recover the output characteristics. Consequently, the lifetime of the solid secondary battery can be increased. It is conventionally believed that the battery performance is deteriorated by overdischarge. Therefore, a conventional solid secondary battery is provided with overdischarge protection means for preventing overdischarge. However, according the first embodiment, a solid secondary battery which has been cycle-deteriorated can be positively overdischarged so that the internal resistance can be reduced and the output characteristics can be recovered.

Claim 2 of JP-2010-225582 A discloses a dynamo-electric device that does not have overdischarge protection means for preventing overdischarge of a lithium secondary battery. However, the technique described in JP-2010-225582 A does not involve "positive overdischarge processing" like the first embodiment of the invention.

The paragraph [0004] of JP-2010-225582 A reads "It is conventionally believed that any error in voltage measurement during discharge will lead to occurrence of overdischarge or polarity inversion and performance of the lithium secondary battery is deteriorated to an unserviceable level. Therefore, in the abovementioned technique, a protection circuit is provided for preventing overdischarge by monitoring the battery voltage during discharge. This protection circuit, which is expensive, constitutes a factor for impeding cost reduction of the lithium secondary battery. Further, even when the protection circuit is provided, it is desired that the configuration of the lithium secondary battery is simplified to contributes to cost reduction thereof." The paragraph reads "In the dynamo-electric device according to the invention, the lithium secondary battery uses an inorganic solid electrolyte so that even after overdischarge or polarity inversion occurs, the lithium secondary battery can be used normally by being recharged."

It is obvious from the description cited above, the invention disclosed in JP-2010-225582 A assumes that the battery is used within an ordinary voltage range, and it does not intend at all "positive overdischarge processing". Specifically, JP-2010-225582 A discloses only that, even if temporary overdischarge occurs in the lithium secondary battery due to some kind of abnormality (e.g. incidental accident), the battery can be protected by the protection circuit which can be simplified by the use of an inorganic solid electrolyte in place of the conventional electrolyte, but it does not intend at all "positive overdischarge processing". Rather, in view of the fact that claim 3 of JP-2010-225582 A is directed to the dynamo-electric device "having" overdischarge protection means, it can be understood that the invention of JP-2010-225582 A is based on a conventional technological idea that adverse effects of overdischarge should be prevented. Therefore, it can be said that there exists an obstructive factor for those skilled in the art who read JP-2010-225582 A to employ an overdischarge processing unit for positively performing overdischarge processing despite the conventional technological idea. The same applies to JP-2010-225581 A. Further, the solid secondary battery system according to the first embodiment has an excellent effect that the internal resistance can be reduced by positively performing the overdischarge processing. This effect is an advantageous effect (prominent effect) that cannot be found either in JP-2010-225581 A or JP-2010-225582 A.

The mechanism why the internal resistance can be reduced by the overdischarge processing in the first embodiment can be inferred as follows. In a typical solid secondary battery, a battery reaction occurs at a solid-solid interface and hence a new membrane (solid electrolyte interface (SEI)) is produced at the interface. Since this membrane has a high resistance, the internal resistance is increased. In contrast, according to the first embodiment of the invention, this membrane can be removed by performing overdischarge processing, and thus the internal resistance can be reduced. The membrane is possibly produced at any solid-solid interface of the solid secondary battery, and it is believed that the membrane is produced more particularly at an interface between an active material and a solid electrolyte material. The reason is that the active material performs an active reaction to absorb and emit metal ions at the surface thereof, while the solid electrolyte material usually has a large contact area with the active material. In particular, the membrane will be more apt to be produced when the combination of the active material and the solid electrolyte material is a combination of different types of compounds. For example, an oxide active material (derived from an oxide) and a sulfide solid electrolyte material (derived from a sulfide) reacts relatively readily with each other, and a membrane will be produced more readily therebetween. The solid secondary battery system according to the first embodiment will be described for each of the components.

(1) Overdischarge Processing Unit

The overdischarge processing unit according to the first embodiment is designed to discharge the solid secondary battery until its SOC of becomes less than 0%. The SOC of the solid secondary battery specifies a working voltage of the battery. In view of safety and prevention of deterioration in performance, the SOC is specified for each battery. In the first embodiment, a state in which the SOC becomes less than 0% is defined as an overdischarged state. The overdischarge processing unit discharges the solid secondary battery until the SOC becomes preferably −5% or less, and more preferably −10% or less, and still more preferably −15% or less. When the solid secondary battery according to this embodiment is a solid lithium secondary battery, for example, the overdischarge processing unit is designed to discharge the battery until the battery voltage becomes preferably less than 2.5 V, more preferably 2.0 V or less, still more preferably 1.5 V or less, particularly preferably 1 V or less, and most preferably 0.5 V or less. Further, the overdischarge processing unit may be designed to discharge the battery until the battery voltage becomes 0 V, or until polarities are inverted (the battery voltage becomes negative) in the battery.

Figure 3:
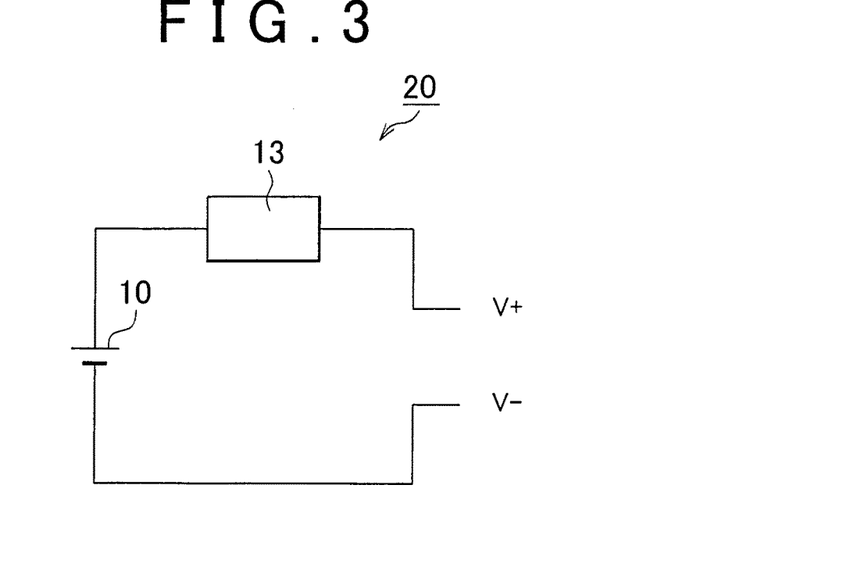
FIG. 3 is a schematic diagram illustrating another example of a solid secondary battery system according to the invention.

The overdischarge processing unit according to the first embodiment can be exemplified by an overdischarge processing unit 11, as shown in FIG. 2, which externally short-circuits the solid secondary battery 10. This overdischarge processing unit 11 is preferably a circuit having at least a resistance. Further, the overdischarge processing unit can also be exemplified by an overdischarge processing unit 13, as shown in FIG. 3, which has a discharge control unit designed to terminate discharge once the battery voltage becomes a predetermined voltage during normal use of the battery, and which is able to turn OFF this discharge control function during overdischarge processing. The discharge control unit can be exemplified by a switch unit which terminates discharge upon receiving a signal from a voltage measurement unit for measuring a voltage of the solid secondary battery.

(2) Solid Secondary Battery

The solid secondary battery according to the first embodiment will be described. The solid secondary battery according to the first embodiment at least has a cathode active material layer, a solid electrolyte layer, and an anode active material layer, and typically further has a cathode collector and an anode collector.

(i) Cathode Active Material Layer

The cathode active material layer according to the first embodiment is a layer containing at least a cathode active material, and may further contain at least one of a solid electrolyte material, a conducting agent and a binding agent, if necessary. A type of the cathode active material is appropriately selected according to a type of the solid secondary battery, and may be an oxide active material, a sulfide active material or the like. The cathode active material used in the solid lithium secondary battery may be, for example, a layered cathode active material such as $LiCoO_2$, $LiNiO_2$, $LiCo_{1/3}Ni_{1/3}Mn_{1/3}O_2$, $LiVO_2$, or $LiCrO_2$, a spinel-type cathode active material such as $LiMn_2O_4$, $Li(Ni_{0.25}Mn_{0.75})_2O_4$, $LiCoMnO_4$, or $Li_2NiMn_3O_8$, an olivine-type cathode active material such as $LiCoPO_4$, $LiMnPO_4$, or $LiFePO_4$, and an NASICON-type cathode active material such as $Li_3V_2P_3O_{12}$.

The shape of the cathode active material may be, for example, a particulate shape or a thin-film shape. The average particle size ($D_{50}$) of the cathode active material is preferably within a range of 1 nm to 100 μm, and more preferably within a range of 10 nm to 30 μM. The content of the cathode active material in the cathode active material layer is not limited particularly, but is preferably within a range of 40 weight % to 99 weight %, for example.

The cathode active material is preferably coated with an ion-conducting oxide. This is because formation of a highly resistive membrane can be prevented at the interface between the cathode active material and another material (e.g. a solid electrolyte material). The Li ion-conducting oxide may be, for example, one represented by a general formula $Li_xAO_y$ (where A denotes B, C, Al, Si, P, S, Ti, Zr, Nb, Mo, Ta or W, and x and y are positive numbers). More specifically, the Li ion-conducting oxide can be exemplified by $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2Moa_4$, $Li_2WO_4$ or the like. Further, the Li ion-conducting oxide can be a composite oxide. Any combination of the materials listed above can be employed as such a composite oxide. Specifically, $Li_4SiO_4$—$Li_3BO_3$, and $Li_4SiO_4$—$Li_3PO_4$ can be cited as the composite oxide. The cathode active material can be coated with the ion-conducting oxide at least partially, or the whole surface of the cathode active material can be coated. The thickness of the ion-conducting oxide coating the cathode active material is preferably within a range of 0.1 nm to 100 nm, and more preferably within a range of 1 nm to 20 nm. The thickness of the ion-conducting oxide can be measured, for example, with use of a transmission electron microscope (TEM).

The cathode active material layer may contain a solid electrolyte material. The addition of the solid electrolyte material makes it possible to improve ion conductivity of the cathode active material layer. The solid electrolyte material will be described later in "(iii) Solid Electrolyte Layer" below. The content of the solid electrolyte material in the cathode active material layer is not limited particularly, but is preferably within a range of 10 weight % to 90 weight %.

The cathode active material layer may contain a conducting agent. The addition of the conducting agent makes it possible to improve electron conductivity of the cathode active material layer. The conducting agent may be, for example, acetylene black, Ketjen black, or carbon fibers. Preferably, the cathode active material layer contains a binding agent. This is because the binding agent can provide the cathode active material layer with high flexibility. The binding agent may be, for example, a fluoride-containing binding agent such as polytetrafluoroethylene (PTFE), polyvinylidene difluoride (PVDF) or the like. The thickness of the cathode active material layer is preferably in the range of 0.1 μm to 1000 μm, and more preferably within the range of 1 μm to 100 μm.

(ii) Anode Active Material Layer

The anode active material layer according to the first embodiment is a layer at least containing an anode active material, and, if necessary, may be further contain at least one of a solid electrolyte material, a conducting agent and a binding agent. The type of the anode active material is not limited particularly as long as it can absorb and emit metal ions. The anode active material can be exemplified by a carbon active material, oxide active material, a metal active material, or the like. The carbon active material is not limited particularly, as long as it contains carbon. The carbon active material can be exemplified by mesocarbon microbeads (MCMB), high orientation graphite (HOPG), hard carbon, soft carbon, or the like. The oxide active material can be exemplified by $Nb_2O_5$, $Li_4Ti_5O_{12}$, SiO or the like. The metal active material may be, for example, In, Al, Si or Sn. Further, a Li-containing metal active material can be used as the anode active material. The Li-containing metal active material is not limited particularly as long as it is an active material containing at least Li. The Li-containing metal active material may be a Li metal or Li alloy. The Li alloy may be an alloy containing Li and at least one of In, Al, Si and Sn.

The shape of the anode active material may be a particulate shape or a thin-film shape. The anode active material has an average particle size ($D_{50}$) preferably within a range of 1 nm to 100 μm, and more preferably within a range of 10 nm to 30 μm. Further, the content of the anode active material within the anode active material layer is not limited particularly, and is preferably within a range of 40 weight % to 99 weight %.

The anode active material layer may contain a solid electrolyte material. The addition of the solid electrolyte material makes it possible to improve ion conductivity of the anode active material layer. The solid electrolyte material will be described later in "(iii) solid Electrolyte Layer"

below. The content of the solid electrolyte material in the anode active material layer is not limited particularly, but is preferably within a range of 10 weight % to 90 weight %. The conducting material and the binding agent used in the anode active material layer are the same as described in "(i) Cathode Active Material Layer" above, and hence description thereof will be omitted. The thickness of the anode active material layer is preferably within the range of 0.1 μm to 1000 μm, and more preferably within a range of 1 μm to 100 μm.

(iii) Solid Electrolyte Layer

The solid electrolyte layer according to the first embodiment is a layer containing at least a solid electrolyte material. The solid electrolyte material can be exemplified by an inorganic solid electrolyte material such as a sulfide solid electrolyte material, an oxide solid electrolyte material, and a nitride solid electrolyte material. A sulfide solid electrolyte material is more preferable than an oxide solid electrolyte material because of its high ion conductivity. An oxide solid electrolyte material is more preferable than a sulfide solid electrolyte material because of its high chemical stability. Further, the solid electrolyte material used in this embodiment may be an inorganic solid electrolyte material containing a halogen.

A sulfide solid electrolyte material usually contains metallic element (M) for conducting ions and sulfur (S). The metallic element can be exemplified by Li, Na, K, Mg, Ca, or the like, and Li is particularly preferable. The sulfide solid electrolyte material preferably contains Li, A (A denotes at least one selected from the group consisting of P, Si, Ge, Al, and B), and S. Further, the sulfide solid electrolyte material may contain a halogen such as Cl, Br, or I. The incorporation of a halogen into the sulfide solid electrolyte material can improve the ion conductivity. Further, the sulfide solid electrolyte material may contain O. The incorporation of O improves the chemical stability.

The sulfide solid electrolyte material having Li ion conductivity can be exemplified by $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive numbers, and Z denotes any of Ge, Zn, and Ga), $Li_2S$—$GeS_2$, $Li_2S$—$SiS_2$—$Li_3PO_4$, $Li_2S$—$SiS_2$-$Li_xMO_y$, (where x and y are positive numbers, and M denotes any of P, Si, Ge, B, Al, Ga, and In). It should be noted that the description as "$Li_2S$—$P_2S_5$" above refers to a sulfide solid electrolyte material composed of a raw material composition containing $Li_2S$ and $P_2S_5$, and the same applies to the other descriptions.

Preferably, the sulfide solid electrolyte material substantially does not contain $Li_2S$, because the chemical stability of the sulfide solid electrolyte material is enhanced. Hydrogen sulfide is produced by $Li_2S$ reacting with water. If $Li_2S$ is contained in the raw material composition in a large proportion, the $Li_2S$ is apt to remain as a residue. The condition that "the sulfide solid electrolyte material substantially does not contain $Li_2S$" can be checked by means of X-ray diffraction. Specifically, when peaks of $Li_2S$ ($2\theta=27.0°$, $31.2°$, $44.8°$, $53.1°$ are not observed, then it can be determined that the sulfide solid electrolyte material substantially does not contain $Li_2S$.

Preferably, the sulfide solid electrolyte material substantially does not contain a cross-linked sulfur, because the chemical stability of the sulfide solid electrolyte material is enhanced. The term "cross-linked sulfur" as used herein means cross-linked sulfur in a compound produced by $Li_2S$ reacting with a sulfide defined by A in the above. A cross-linked sulfur having a structure of $S_3P$—S—$PS_3$ produced by reaction between $Li_2S$ and $P_2S_5$ is an example of such cross-linked sulfur. This type of cross-linked sulfur reacts readily with water to produce hydrogen sulfide. The condition that "the sulfide solid electrolyte material substantially does not contain a cross-linked sulfur" can be checked by measurement of Raman spectroscopy spectra. In case of a $Li_2S$—$P_2S_5$-based sulfide solid electrolyte material, a peak of a $S_3P$—S—$PS_3$ structure usually appears at 402 $cm^{-1}$. Therefore, it is desirable that this peak is not detected. A peak of a $PS_4^{3-}$ structure usually appears at 417 $cm^{-1}$. In the first embodiment, it is desirable that intensity $I_{402}$ at 402 $cm^{-1}$ is lower than intensity $I_{417}$ at 417 $cm^{-1}$. More specifically, the intensity $I_{402}$ is preferably 70% or less of the intensity $I_{417}$, more preferably 50% or less, and still more preferably 35% or less.

When the sulfide solid electrolyte material is composed of a raw material composition containing $Li_2S$ and $P_2S_5$, the proportion of $Li_2S$ relative to the total of $Li_2S$ and $P_2S_5$ is preferably within a range of 70 mol % to 80 mol %, more preferably within a range of 72 mol % to 78 mol %, and still more preferably within a range of 74 mol % to 76 mol %. In this manner, the sulfide solid electrolyte material is allowed to have ortho-composition or composition close thereto, and hence is allowed to have high chemical stability. The term "ortho-" as used herein generally means an oxo acid having the highest degree of hydration among those obtained by hydrating the same oxide. In the first embodiment, a crystal composition of a sulfide having a largest amount of $Li_2S$ added is called ortho-composition. In $Li_2S$—$P_2S_5$ system, $Li_3PS_4$ corresponds to the ortho-composition. In the case of a $Li_2S$—$P_2S_5$-based sulfide solid electrolyte material, the ratio between $Li_2S$ and $P_2S_5$ for obtaining the ortho-composition is $Li_2S:P_2S_5=75:25$ on a molar basis. Even when $Al_2S_3$ or $B_2S_3$ is used in place of $P_2S_5$ in the raw material composition, the preferable ranges are the same as those stated above. In a $Li_2S$—$Al_2S_3$ system, $Li_3AlS_3$ corresponds to the ortho-composition, while in a $Li_2S$—$B_2S_3$ system, $Li_3BS_3$ corresponds to the ortho-composition.

When the sulfide solid electrolyte material is composed of a raw material composition containing $Li_2S$ and $SiS_2$, the proportion of $Li_2S$ relative to a total of $Li_2S$ and $SiS_2$ is preferably within a range of 60 mol % to 72 mol %, more preferably within a range of 62 mol % to 70 mol %, and still more preferably within a range of 64 mol % to 68 mol %. In this manner, the sulfide solid electrolyte material is allowed to have ortho-composition or composition close thereto, and hence is allowed to have high chemical stability. In a $Li_2S$—$SiS_2$ system, $Li_4SiS_4$ corresponds to the ortho-composition. In the case of a $Li_2S$—$SiS_2$-based sulfide solid electrolyte material, the ratio between $Li_2S$ and $SiS_2$ suitable for obtaining the ortho-composition is $Li_2S:SiS_2=66.6:33.3$ on a molar basis. Even when $GeS_2$ is used in place of $SiS_2$ in the raw material composition, the preferable ranges are the same as those stated above. In a $Li_2S$—$GeS_2$ system, $Li_4GeS_4$ corresponds to the ortho-composition.

When the sulfide solid electrolyte material is composed of a raw material composition containing LiX (X=Cl, Br or I), the proportion of LiX is preferably within a range of 1 mol % to 60 mol %, more preferably within a range of 5 mol % to 50 mol %, and still more preferably within a range of 10 mol % to 40 mol %. When the sulfide solid electrolyte material is composed of a raw material composition containing $Li_2O$, the proportion of $Li_2O$ is preferably within a range of 1 mol % to 25 mol %, and more preferably within a range of 3 mol % to 15 mol %.

The sulfide solid electrolyte material may be sulfide glass, or crystallized sulfide glass, or a crystalline material obtained by a solid phase method. The sulfide glass can be obtained, for example, by performing mechanical milling (e.g. ball milling) on a raw material composition. The crystallized sulfide glass can be obtained by heat treating sulfide glass at a temperature equal to or higher than a crystallization temperature. When the sulfide solid electrolyte material is a Li ion conductor, the Li ion conductivity at ambient temperature is preferably equal to or higher than $1 \times 10^{-5}$ S/cm, and preferably equal to or higher than $1 \times 10^{-4}$ S/cm.

An oxide solid electrolyte material having Li ion conductivity can be exemplified by a compound having NASICON structure. The compound having NASICON structure can be exemplified by a compound represented by a general formula $Li_{1+x}Al_xGe_{2-x}(PO_4)_3$ ($0 \leq x \leq 2$). $Li_{1.5}Al_{0.5}Ge_{1.5}(PO_4)_3$ is particularly preferable as the oxide solid electrolyte material. Another example of a compound having NASICON structure is a compound represented by a general formula $Li_{1+x}Al_xTi_{2-x}(PO_4)_3$ ($0 \leq x \leq 2$). $Li_{1.5}Al_{0.5}Ti_{1.5}(PO_4)_3$ is particularly preferable as the oxide solid electrolyte material. The oxide solid electrolyte material can be further exemplified by LiLaTiO (e.g. $Li_{0.34}La_{0.51}TiO_3$), LiPON (e. g. $Li_{2.9}PO_{3.3}N_{0.46}$), and LiLaZrO (e.g. $Li_7La_3Zr_2O_{12}$).

The shape of the solid electrolyte material may be, for example, a particulate shape or a thin-film shape. The average particle size ($D_{50}$) of the solid electrolyte material is preferably within a range of 1 nm to 100 µm, and particularly preferably within a range of 10 nm to 30 µm. The content of the solid electrolyte material in the solid electrolyte layer is preferably equal to or more than 60 weight %, more preferably equal to or more than 70 weight %, and particularly preferably equal to or more than 80 weight %. The solid electrolyte layer may contain a binding agent, or may be composed only of a solid electrolyte material. The thickness of the solid electrolyte layer will significantly differ according a structure of the battery. For example, the thickness of the solid electrolyte layer is preferably within a range of 0.1 µm to 1000 µm, and more preferably within a range of 1 µm to 100 µm.

(iv) Other Members

The solid secondary battery according to the first embodiment may further includes a cathode collector for collecting power of the cathode active material layer, and an anode collector for collecting power of the anode active material layer. The material of the cathode collector can be exemplified by SUS, aluminum, nickel, iron, titanium, carbon and so on. The material of the anode collector can be selected from SUS, copper, nickel, carbon and so on. An ordinary battery case for solid secondary battery can be used as the battery case to be used in the first embodiment. The battery case may be, for example, a battery case made of SUS.

(v) Solid Secondary Battery

A solid secondary battery according to the first embodiment may be, for example, a solid lithium secondary battery, a solid sodium secondary battery, a solid potassium secondary battery, a solid magnesium secondary battery, a solid calcium secondary battery or the like, and a solid lithium secondary battery is particularly preferable. The solid secondary battery according to the first embodiment, which can be repeatedly charged and discharged, is useful as an in-vehicle battery. The shape of the solid secondary battery may be, for example, a coin shape, a laminate shape, a cylindrical shape, a rectangular shape, or the like. The manufacturing method of a solid secondary battery is not particularly limited, and a method similar to a manufacturing method of conventional solid secondary batteries can be used as long as it can produce a solid secondary battery described above. For example, a pressing method, a coating method, a deposition method, or a spraying method can be employed.

(3) Solid Secondary Battery System

The solid secondary battery system according to the first embodiment is not limited particularly as long as it has the overdischarge processing unit and the solid secondary battery as described above. The solid secondary battery system may have either a single solid secondary battery or a plurality of solid secondary batteries. When the solid secondary battery system has a plurality of solid secondary batteries, those solid secondary batteries may be connected either in series or in parallel, or may be connected in combination of series and parallel connections.

Figure 4:
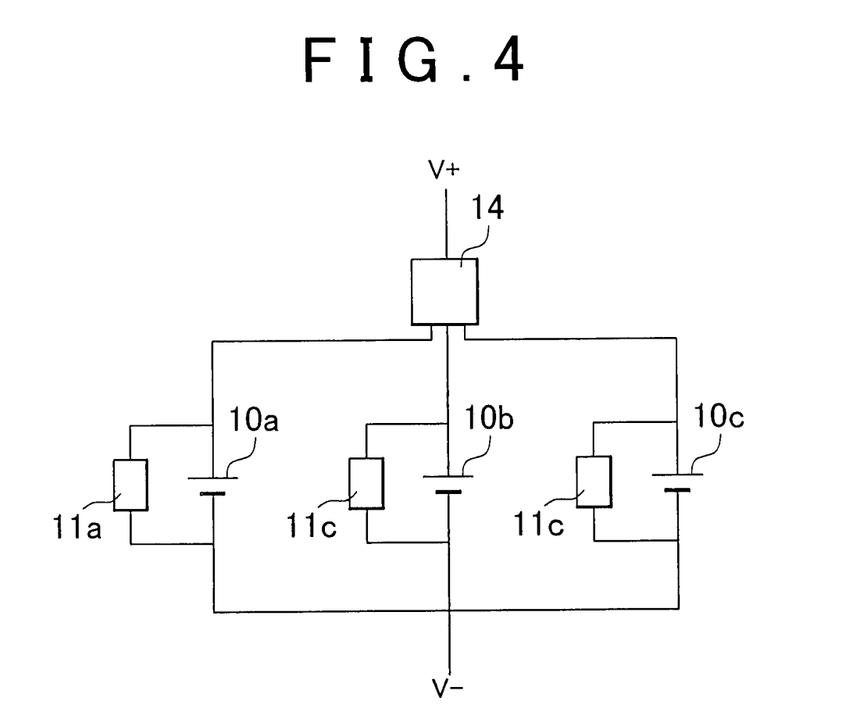
FIG. 4 is a schematic diagram illustrating still another example of a solid secondary battery system according to the invention.

It is preferable that the solid secondary battery system according to the first embodiment has a plurality of solid secondary batteries, and a selective control unit that selectively controls such that the overdischarge processing unit functions only for some of these solid secondary batteries. This makes it possible to perform overdischarge processing on some of the solid secondary batteries while supplying power by the other batteries. Such a solid secondary battery system may be exemplified by the one, as shown in FIG. 4, wherein overdischarge processing units 11a to 11c are connected to solid secondary batteries 10a to 10c, respectively, and has a selective control unit 14 which performs selective control such that the overdischarge processing units functions only for some of the solid secondary batteries.

2. Second Embodiment

A solid secondary battery system according to a second embodiment will be described. The solid secondary battery system according to the second embodiment is characterized by including a solid secondary battery having a cathode active material layer, an anode active material layer, and a solid electrolyte layer formed between the cathode active material layer and the anode active material layer, and an overdischarge processing unit which discharges the battery until its cathode potential becomes less than Ep (V), when Ep (V) denotes a cathode potential before the cathode active material contained in the cathode active material layer emits metal ions.

According to the second embodiment, the provision of the overdischarge processing unit makes it possible to reduce the internal resistance and to recover the output characteristics. Therefore, the life time of the solid secondary battery can be increased.

When the cathode potential observed before the cathode active material contained in the cathode active material layer emits metal ions is denoted by Ep (V), the overdischarge processing unit according to the second embodiment discharges the battery until the cathode potential becomes less than Ep (V). In the second embodiment, the state in which the cathode potential is less than Ep (V) is defined as overdischarged state. The cathode potential Ep (V) varies according to a type of the cathode active material. For example, when the cathode active material used in a solid lithium secondary battery is $LiNiO_2$, Ep (V) is 3.55 V; when $LiNi_{1/3}Co_{1/3}Mn_{1/3}O_2$, Ep (V) is 3.65 V; when $LiMn_{1.5}Ni_{0.5}O_4$, Ep (V) is 3.7 V; and when $LiCoO_2$, Ep (V) is 3.65 V. The overdischarge processing unit is designed to discharge the battery until the cathode potential becomes preferably Ep-0.5 (V) or less, more preferably Ep-1 (V) or less, still more preferably Ep-1.5 (V) or less, and particularly preferably Ep-2 (V) or less. The cathode potential can be measured directly, or can be calculated based on a battery configuration and battery voltage. When the solid secondary battery according to this second embodiment is a solid lithium secondary battery, the overdischarge processing unit discharges the battery until the battery voltage becomes preferably less than 2.5 V, more preferably 2.0 V or less, still more preferably 1.5 V or less, particularly preferably 1 V or less, and most preferably 0.5 V or less. The overdischarge processing unit may be designed to discharge the battery until the battery voltage becomes 0 V, or may be designed to discharge the battery until the battery polarities are inverted (the voltage becomes negative).

Other features of the solid secondary battery system according to the second embodiment are the same as those described in relation to the first embodiment, and hence description thereof will be omitted.

3. Third Embodiment

A solid secondary battery system according to a third embodiment will be described. The solid secondary battery system according to the third embodiment includes a solid secondary battery having a cathode active material layer containing an active material causing a battery reaction at a potential higher than a Li potential by 3 V or more, an anode active material layer containing a Li-containing metal active material or a carbon active material, and a solid electrolyte layer formed between the cathode active material layer and the anode active material layer, and an overdischarge processing unit for discharging the solid secondary battery until the voltage thereof becomes less than 2.5 V.

According to the third embodiment, the provision of the overdischarge processing unit makes it possible to reduce the internal resistance and to recover the output characteristics. Consequently, the life time of the solid secondary battery can be increased.

The cathode active material layer used in the third embodiment contains an active material causing a battery reaction at a potential higher than a Li potential by 3 V or more. Such an active material can be exemplified by a layered cathode active material such as $LiCoO_2$, $LiNiO_2$, $LiCo_{1/3}Ni_{1/3}Mn_{1/3}O_2$, $LiVO_2$, or $LiCrO_2$, a spinel-type cathode active material such as $LiMn_2O_4$, $Li(Ni_{0.25}Mn_{0.75})_2O_4$, $LiCoMnO_4$, or $Li_2NiMn_3O_8$, an olivine-type cathode active material such as $LiCoPO_4$, $LiMnPO_4$, or $LiFePO_4$, and NASICON-type cathode active material such as $Li_3V_2P_3O_{12}$.

The anode active material layer used in the third embodiment contains a Li-containing metal active material or a carbon active material. The Li-containing metal active material is not limited particularly as long as it is an active material containing at least Li, and it may be a Li metal or a Li alloy. The Li alloy may be an alloy containing Li and at least one of In, Al, Si and Sn. The carbon active material is not limited particularly as long as it contains carbon, and it may be, for example, MCMB, HOPG, hard carbon, soft carbon or the like.

The overdischarge processing unit according to the third embodiment is designed to discharge the battery until the battery voltage becomes less than 2.5 V, preferably until 2.0 V or less, more preferably until 1.5 V or less, still more preferably until 1 V or less, and particularly preferably until 0.5 V or less. The overdischarge processing unit may be designed to discharge the battery until the battery voltage becomes 0 V, or may be designed to discharge the battery so that the battery polarities are inverted (the voltage becomes negative).

Other features of the solid secondary battery system according to the third embodiment are the same as those described in relation to the first embodiment, and hence description thereof will be omitted here.

B. Manufacturing Method of Recoverable Solid Secondary Battery

Next, a manufacturing method of a recoverable solid secondary battery according to this embodiment will be described. The manufacturing method of a recoverable solid secondary battery according to this embodiment performs overdischarge processing (overdischarge processing step). While this overdischarge processing is not limited particularly as long as it overdischarges the solid secondary battery, the overdischarge processing can be specified more accurately based on some viewpoints of the overdischarge. The following description of the manufacturing method of a recoverable solid secondary battery according to the invention will be made based on three main embodiments.

1. First Embodiment

A manufacturing method of a recoverable solid secondary battery according to a first embodiment includes an overdischarge processing step of discharging a degraded solid secondary battery until its SOC becomes less than 0%, the degraded solid secondary battery having a cathode active material layer, an anode active material layer, and a solid electrolyte layer formed between the cathode active material layer and the anode active material layer.

According to the first embodiment, the internal resistance can be reduced and the recoverable solid secondary battery with recovered output characteristics can be obtained by performing the overdischarge processing step.

The term "degraded solid secondary battery" as used in the first embodiment means a solid secondary battery which has been charged and discharged at least once. The internal resistance of the degraded solid secondary battery is preferably 1.5 times or more, more preferably 2 times or more, and still preferably 3 times or more of the internal resistance (initial resistance) of an undegraded solid secondary battery. This is because the effect of reducing the internal resistance can be obtained more easily. The internal resistance of a degraded solid secondary battery can be determined by means of an impedance analysis as described later in Examples.

The overdischarge processing step in the first embodiment is a step of discharging a degraded solid secondary battery until the SOC becomes less than 0%. The particulars of the overdischarge processing are the same as those described in the section above, "A. Solid Secondary Battery System, 1. First Embodiment". Therefore, description thereof will be omitted here. The overdischarge processing according to the first embodiment may be exemplified by processing performed using a discharge device (charge and discharge device), or processing performed by external short-circuit. When the overdischarge processing is performed by constant current discharge (CC discharge), the current value is not limited particularly but is preferably within a range of 0.1 mAh to 10 mAh. If the current value is too small, it takes a long time to discharge, whereas if the current value is too large, the overvoltage is increased.

In the first embodiment, it is preferable to perform overdischarge processing to discharge the battery until the battery voltage reaches a predetermined voltage, as well as voltage sustaining processing to sustain the battery voltage at the predetermined voltage. This is because it is believed that a highly resistive membrane produced at a solid-solid interface (at least one of a first membrane at a first interface between the cathode active material and the solid electrolyte and a second membrane at a second interface between the anode active material and the solid electrolyte) can be removed by performing the voltage sustaining processing. For example, when the overdischarge processing is performed using a discharge device, it is preferable to perform constant voltage discharge (CV discharge) as the voltage sustaining processing. On the other hand, when the overdischarge processing is performed by means of external short-circuit, it is preferable that the externally short-circuited state (with the voltage being kept at 0 V, for example) is sustained as the voltage sustaining processing. The time for the voltage sustaining processing is not limited particularly, but is preferably 1 minute or more, more preferably within a range from 1 minute to 100 hours, and more preferably within a range from 1 minute to 20 hours.

In the first embodiment, it is preferable to provide, after the overdischarge processing step, a sustaining step of sustaining the solid secondary battery in a state in which it is neither charged nor discharged. This is because the initial resistance of the solid secondary battery can be made even lower. It is preferable that, in the sustaining step, the voltage of the solid secondary battery (open-circuit voltage) is maintained low. For example, when the solid secondary battery in this embodiment is a solid lithium secondary battery, the voltage of the solid secondary battery in the sustaining step is preferably less than 2.5 V, more preferably 2 V or less, still more preferably 1.5 V or less, and particularly preferably 1 V or less. The sustaining time is preferably 1 minute or more and more preferably 1 hour or more. If the sustaining time is too short, the initial resistance possibly cannot be reduced sufficiently. Further, the sustaining time is preferably 30 days or less, more preferably 7 days or less, and still more preferably 3 days or less. If the sustaining time is too long, the processing time is increased while the effect is not changed.

2. Second Embodiment

Next, a manufacturing method of a recoverable solid secondary battery according to a second embodiment will be described. The manufacturing method of a recoverable solid secondary battery according to the second embodiment is characterized by including an overdischarge processing step in which a degraded solid secondary battery, which has a cathode active material layer, an anode active material layer, and a solid electrolyte layer formed between the cathode active material layer and the anode active material layer, is discharged until its cathode potential becomes lower than Ep (V) when Ep (V) denotes a cathode potential before a cathode active material contained in the cathode active material layer emits metal ions.

According to the second embodiment, the internal resistance can be reduced and the recoverable solid secondary battery with recovered output characteristics can be obtained by performing the overdischarge processing step.

The cathode potential Ep (V) and a cathode potential after the overdischarge processing are the same as the content described in "A. solid Secondary Battery System, 2. Second Embodiment", and hence description thereof will be omitted here. The other features of the manufacturing method of a recoverable solid secondary battery according to the second embodiment are the same as those described in the first embodiment above, and hence description thereof will be omitted here.

3. Third Embodiment

A manufacturing method of a recoverable solid secondary battery according to a third embodiment will be described. The manufacturing method of a recoverable solid secondary battery according to the third embodiment includes an overdischarge processing step in which a degraded solid secondary battery, which has a cathode active material layer containing an active material causing a battery reaction at a potential higher than a Li potential by 3 V or more, an anode active material layer containing a Li-containing metal active material or a carbon active material, and a solid electrolyte layer formed between the cathode active material layer and the anode active material layer, is discharged until the voltage of the degraded solid secondary battery becomes less than 2.5 V.

According to the third embodiment, the internal resistance can be reduced and the recoverable solid secondary battery with recovered output characteristics can be obtained by performing the overdischarge processing step.

The cathode active material, the anode active material and so on in the third embodiment are the same as the content described in "A. Solid Secondary Battery System, 3. Third Embodiment" above, and hence description thereof will be omitted here. The other features of the manufacturing method of a recoverable solid secondary battery according to the third embodiment are the same as those described in the first embodiment, and hence description thereof will be omitted here.

It should be understood that the embodiments above have been given only by way of example, and the invention is not limited to these embodiments.

EXAMPLES

The invention will be described more specifically with reference to Examples and comparative examples.

Example 1

Synthesis of Sulfide Solid Electrolyte Material

Lithium sulfide ($Li_2S$, produced by Nippon Chemical Industrial) and phosphorus pentasulfide ($P_2S_5$, produced by Aldrich) were used as starting materials. $Li_2S$ and $P_2S_5$ were weighed in a glove box under Ar atmosphere (at a dew point of $-70°$ C.) such that a molar ratio of $Li_2S$ to $P_2S_5$ was 75 to 25 ($Li_3PS_4$, ortho-composition). Then 2 g of this mixture was mixed in an agate mortar for 5 minutes. Thereafter, 2 g of the mixture thus obtained was placed in a planetary ball mill container (45 cc, made of $ZrO_2$), 4 g of anhydrous heptane (with water content of 30 ppm or less) and 53 g of $ZrO_2$ balls ($\varphi=5$ mm) were added thereto, and the container was sealed completely (Ar atmosphere). The container was attached to a planetary ball milling machine (P7 produced by Fritsch), and mechanical milling was performed at a table speed of 500 rpm for 40 hours. A sample thus obtained was dried on a hot plate so as to remove the heptanes, whereby sulfide solid electrolyte material ($75Li_2S.25P_2S_5$ glass) was obtained.

Fabrication of Solid Secondary Battery $LiNi_{1/3}Co_{1/3}Mn_{1/3}O_2$ (cathode active material, produced by Nichia) was weighed to 12.03 mg, vapor growth carbon fibers (VGCF) (conducting agent, produced by Showa Denko) was weighed to 0.51 mg, and the sulfide solid electrolyte material was weighed to 5.03 mg, and they were mixed to provide a cathode composite. Graphite (anode active material, produced by Mitsubishi Chemical) was weighed to 9.06 mg, and the sulfide solid electrolyte material was weighed to 8.24 mg, and they were mixed to provide an anode composite.

Then, 18 mg of the sulfide solid electrolyte material was placed in a 1 $cm^2$ cm die and pressed under a pressure of 1 ton/$cm^2$, whereby a solid electrolyte layer was formed. 17.57 mg of the cathode composite was applied on one surface of the solid electrolyte layer and pressed with a pressure of 1 ton/$cm^2$, whereby a cathode active material layer was formed. Subsequently, 17.3 mg of the anode composite was applied on the other surface of the solid electrolyte layer and pressed with a pressure of 4 ton/$cm^2$, whereby a power generation element was obtained. A SUS304 (cathode collector and anode collector) was arranged on each surface of the obtained power generation element, whereby a solid secondary battery was obtained.

Measurement of Initial Resistance

The obtained solid secondary battery was constant-current (CC) charged at 0.3 mA to 4.2 V, and then CC discharged at 0.3 mA to 2.5 V. The battery was then charged to 3.6 V and the voltage was adjusted. Impedance analysis was performed with an impedance analyzer (produced by Slartron) to obtain a resistance (initial) of the battery.

Preservation Test and Overdischarge Processing

After the measurement of the initial resistance, the battery was constant-voltage (CV) charged to 4.2 V, and preserved at 60° C. for 30 days. After the preservation, the resistance (after 30 days) of the battery was obtained in the same manner as described above. The battery was then CC discharged at 1.5 mA to 0 V, and then CV discharged at 0 V for 10 hours. After confirming that the open-circuit voltage was 0.5 V or less, the battery was preserved at 25° C. for 24 hours. After the preservation, the resistance (overdischarged after 30 days) was obtained in the same manner as described above.

Resistivity

Figure 5:
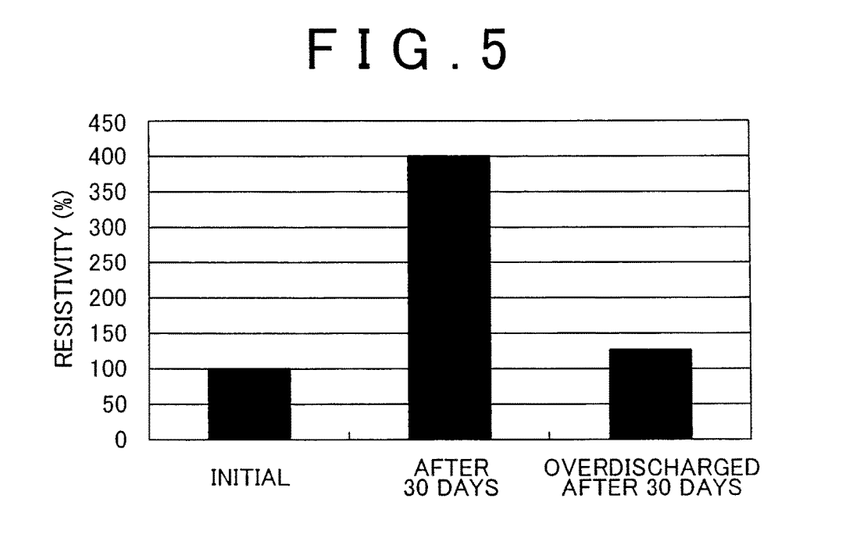
FIG. 5 shows a result of resistivity measurements for a solid secondary battery obtained in Example 1.

Based on the resistance (initial), resistivities were calculated for the resistance (after 30 days) and the resistance (overdischarged after 30 days). The result is shown in FIG. 5. As shown in FIG. 5, the resistance (after 30 days) was increased compared to the resistance (initial), whereas the resistance (overdischarged after 30 days) was recovered to substantially the same level as the resistance (initial). In other words, it was confirmed that the internal resistance was reduced and the output characteristics were improved by performing the overdischarge processing.

Example 2

Fabrication of Solid Secondary Battery

A solid secondary battery was fabricated in the same manner as in Example 1 except that aluminum foil (produced by Nippon Foil Mfg.) was used as a cathode collector and copper foil (produced by Nippon Foil Mfg.) was used as an anode collector.

(Measurement of Initial Resistance)

Resistance (initial) was obtained in the same manner as in Example 1.

(Cycle Test and Overdischarge Processing)

After the measurement of the initial resistance, CC charge and discharge (2.5 V-4.2 V) were performed at 60° C. at 6 mA for 300 cycles and for 500 cycles. After the charge and discharge cycles, a resistance (after 300 cycles) and a resistance (after 500 cycles) were obtained in the same manner as described above. The battery was then CC discharged at 1.5 mA to 0 V, and CV discharged at 0 V for 10 hours. After confirming that the open-circuit voltage was 0.5 V or less, the battery was preserved at 25° C. for 24 hours. After the preservation, a resistance (overdischarged after 500 cycles) was obtained in the same manner as described above.

Resistivity

Figure 6:
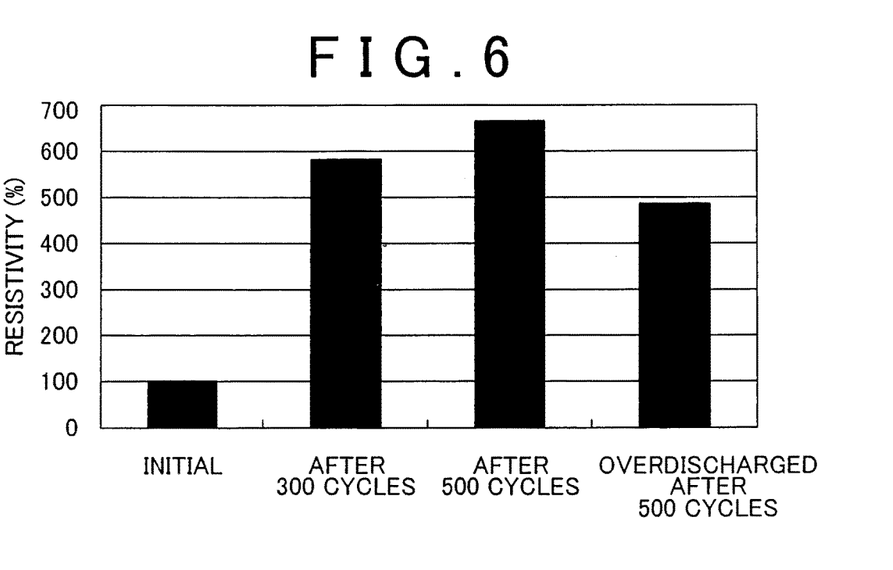
FIG. 6 shows a result of resistivity measurements for a solid secondary battery obtained in Example 2.

Based on the resistance (initial), resistivities were calculated for the resistance (after 300 cycles), the resistance (after 500 cycles), and the resistance (overdischarged after 500 cycles). The result is shown in FIG. 6. As shown in FIG. 6, the resistance (after 300 cycles) and the resistance (after 500 cycles) were increased compared to the resistance (initial), whereas the resistance (overdischarged after 500 cycles) was recovered to be lowered than the resistance (after 300 cycles). In other words, it was confirmed that the internal resistance was reduced and the output characteristics were improved by performing the overdischarge processing.

The invention claimed is:

1. An in-vehicle solid secondary battery system comprising:
    at least one solid secondary battery that includes a cathode active material layer, an anode active material layer, and a solid electrolyte layer formed between the cathode active material layer and the anode active material layer; and
    an overdischarge processing unit that overdischarges the at least one solid secondary battery including a solid electrolyte interface membrane so as to reduce internal resistance of the at least one solid secondary battery until cathode potential of the battery becomes Ep-0.5 V or less, wherein Ep V denotes a cathode potential before a cathode active material contained in the cathode active material layer emits metal ions,
    wherein the overdischarge processing unit is an external short-circuit unit configured to externally short-circuit the at least one solid secondary battery including the solid electrolyte interface membrane.

2. The in-vehicle solid secondary battery system according to claim 1, wherein:
    the at least one solid secondary battery is a plurality of solid secondary batteries; and
    the in-vehicle solid secondary battery system further comprises a selective control unit that selectively controls so that the overdischarge processing unit functions only to some of the solid secondary batteries.

3. The in-vehicle solid secondary battery system according to claim 1, wherein at least one of the cathode active material layer, the anode active material layer and the solid electrolyte layer contains a sulfide solid electrolyte material.

4. The in-vehicle solid secondary battery system according to claim 1, wherein
    the cathode active material layer contains a cathode active material coated with an ion-conducting oxide.

5. A manufacturing method of a recoverable solid secondary battery, comprising:
    overdischarge processing of overdischarging a solid secondary battery that includes a cathode active material layer, an anode active material layer, and a solid electrolyte layer formed between the cathode active material layer and the anode active material layer, so as to reduce internal resistance of the at least one solid secondary battery until cathode potential of the battery becomes Ep-0.5 V or less, wherein Ep V denotes a cathode potential before a cathode active material contained in the cathode active material layer emits metal ions, wherein in the overdischarge processing, the solid secondary battery including the solid electrolyte layer is discharged by external short-circuit.

6. The manufacturing method according to claim 5, wherein in the overdischarge processing, the solid secondary battery including the solid electrolyte layer is discharged to 0 V.

7. The manufacturing method according to claim 5, wherein at least one of a first membrane at a first interface between a cathode active material and a solid electrolyte and a second membrane at a second interface between an anode active material and the solid electrolyte is removed by discharging the solid secondary battery including the solid electrolyte layer.

* * * * *